US008941883B2

(12) United States Patent
Hermus (10) Patent No.: US 8,941,883 B2
(45) Date of Patent: Jan. 27, 2015

(54) METHOD FOR CREATING A COPY IMAGE AND REPRODUCTION SYSTEM (71) Applicant: OCE-Technologies B.V., Venlo (NL)

(72) Inventor: Bastiaan J. Hermus, Eindhoven (NL)

(73) Assignee: OCE-Technologies B.V., Venlo (NL)

( * ) Notice: Subject to any disclaimer, the term of this patent is extended or adjusted under 35 U.S.C. 154(b) by 0 days.

(21) Appl. No.: 14/063,854

(22) Filed: Oct. 25, 2013

(65) Prior Publication Data
US 2014/0118758 A1 May 1, 2014

Related U.S. Application Data (63) Continuation of application No. PCT/EP2012/056647, filed on Apr. 12, 2012.

(30) Foreign Application Priority Data

Apr. 28, 2011 (EP) .................... 11164183

(51) Int. Cl.
H04N 1/60 (2006.01)
G03F 3/10 (2006.01)
G06K 9/00 (2006.01)
G06K 15/02 (2006.01)
H04N 1/00 (2006.01)

(52) U.S. Cl.
CPC ........... *H04N 1/6011* (2013.01); *H04N 1/6027* (2013.01); *H04N 1/603* (2013.01); *G06K 15/025* (2013.01); *G06K 15/1878* (2013.01); *H04N 1/00129* (2013.01); *H04N 1/00278* (2013.01)
USPC ............. 358/1.9; 358/527; 382/162; 382/167

(58) Field of Classification Search
CPC .................... H04N 1/6027; H04N 2201/3271; H04N 1/32112; H04N 1/32144; H04N 1/60; G06T 2200/24; G06T 2207/10008; G06T 2207/10024; G06T 2207/20092
USPC ................ 358/1.9, 3.24, 3.27, 519, 521, 527; 382/162, 167; 345/589, 590, 591
See application file for complete search history.

(56) References Cited

U.S. PATENT DOCUMENTS 7,372,597 B2 * 5/2008 Topfer et al. ................... 358/1.9
2003/0020973 A1 1/2003 Kondo

FOREIGN PATENT DOCUMENTS

EP 0967790 A2 12/1999
WO WO 01/78368 A2 10/2001

*Primary Examiner* — Charlotte M Baker
(74) *Attorney, Agent, or Firm* — Birch, Stewart, Kolasch & Birch, LLP (57) ABSTRACT A method creates a copy image from a hardcopy original on a reproduction system including a display. The method includes displaying a predetermined digital image according to image parameters set with initial image parameter values, reading out image parameter values entered by a user for replacing the initial image parameter values and characterizing the hardcopy original, displaying the predetermined digital image in accordance with the read-out image parameter values, determining a first conversion of image parameters mapping the initial image parameter values to the read-out image parameter values, determining a second conversion of image parameters by inverting the first conversion, scanning the hardcopy original resulting in scan-bound image parameter values, applying the second conversion to the scan-bound image parameter values resulting in converted image parameter values, and creating the copy image by taking into account the converted image parameter values. A reproduction system is configured for applying the method.

5 Claims, 7 Drawing Sheets

METHOD FOR CREATING A COPY IMAGE AND REPRODUCTION SYSTEM

CROSS-REFERENCE TO RELATED APPLICATIONS

This application is a Continuation of International Application No. PCT/EP2012/056647, filed on Apr. 12, 2012, and for which priority is claimed under 35 U.S.C. §120, and which claims priority under 35 U.S.C. §119 to Application No. 11164183.3, filed in Europe on Apr. 28, 2011. The entirety of each of the above-identified applications is expressly incorporated herein by reference.

BACKGROUND OF THE INVENTION

1. Field of the Invention

The present invention relates to a method for creating a copy image from a hardcopy original on a reproduction system comprising a display, wherein the method comprises the steps of displaying a predetermined digital image at the display of the reproduction system according to image parameters which are set with initial image parameter values and reading out image parameter values entered by a user.

The present invention also relates to a reproduction system suitable for executing the method according to the invention.

2. Background of the Invention

Reproduction systems are known comprising a scanner in order to scan hardcopy originals, e.g. paper originals. Such a scanner may be a color scanner which can be used to produce a color scan of the hardcopy original. A reproduction system comprising a scanner may also comprise a print engine in order to print a scan of the hardcopy original. The print engine produces a print of the hardcopy original. Such a reproduction system usually has a local user interface or a remote workstation comprising a display means for displaying and an entering means for preparing the reproduction system for the reproduction of the hardcopy original.

A copy image is defined as a product of a scanning action. This product may take the form of a scan file being a number of bits of a bitmap residing in a memory of the reproduction system, or may take the form of a print out which is printed by the reproduction system on a receiving material. The copy image may be a color copy image.

A preparing step for the reproduction of the hardcopy original is setting image parameters, for example for tuning of the brightness, the contrast and the colors of the copy image.

When making a copy image, it may be very hard to make a satisfactory copy image, in particular, when no preview is available, because the hardcopy original has not been scanned yet. Reasons for this difficulty may be that the hardcopy original has color related problems, the scanner perceives the colors of the hardcopy original different from how the user sees them, or the printer has not been calibrated correctly. A color related problem of the hardcopy original may be detected at inspection of the hardcopy original which shows, for example, blue sky, human skin, green grass which is too blue, not a color of typical human skin, too green, respectively.

Typically, a reproduction system has an operator panel via which a user has to select how a color or a value of another image parameter of the hardcopy original should be changed in order to get a desired copy image. The user has to characterize the colors of the desired copy image. To be able to do this, the user must be knowledgeable about color-theory. Such a change of colors may take place in an RGB domain, so knowledge of the user of the kind of marking material like inks and behavior of the marking material does not help, since they are expressed in the CMYK domain.

Typically the user is offered a way to indicate to the reproduction system what the copy image should look like by means of displaying a predetermined digital image at the display means, e.g. the operator panel, according to image parameters which are set with initial image parameter values. These image parameters may be visualized and displayed by the display means. The user may change these initial image parameter values in order to change the predetermined digital image into an image which shows the desired output. This is very helpful as long as the hardcopy original is of good quality, a scanner is well-calibrated and a print engine does not have a problem related to print quality. However, the hardcopy original may be deviating concerning the colors, the contrast or the brightness. Unfortunately, when the hardcopy original is far from perfect and the image parameter values of the predetermined digital image are changed, it is unclear what the copy image will look like when printed because of the imperfect hardcopy original. The user may only get the correct image parameter values after several trial-and-error efforts. Therefore, it is difficult to get the correct image parameter values quickly.

SUMMARY OF THE INVENTION

It is an object of the present invention to provide a method which enables the user to produce quickly a qualitatively good copy image.

According to the present invention, this object is achieved by a method comprising the steps of reading out image parameter values entered by a user for replacing the initial image parameter values and characterizing the hardcopy original, displaying the predetermined digital image in accordance with the read-out image parameter values, determining a first conversion of image parameters mapping the initial image parameter values of the image parameters to the read-out image parameter values, determining a second conversion of image parameters by inverting the first conversion, scanning the hardcopy original resulting in scan-bound image parameter values, applying the second conversion to the scan-bound image parameter values resulting in converted image parameter values, and creating the copy image by taking into account the converted image parameter values.

By doing so, the user is offered the possibility to characterize the hardcopy original by entering image parameter values. The user has the hardcopy original available and can simply imitate what the hardcopy original looks like. The second conversion is equal to the inverted first conversion and is applied to get a good starting point for image parameters for the hardcopy original to be reproduced despite a poor quality of the hardcopy original. The method comprises the step of scanning the hardcopy original into a scan file. The reproduction system involved comprises a scanner. By making a scan file according to the method, scan-bound image parameter values are produced. The scan-bound image parameter values are a good starting point for a qualitative good copy image despite the poor quality of the hardcopy original. Since the hardcopy original is available for the user and therefore easy to imitate, the copy image is correct in one try.

In case the reproduction system only comprises a scanner, the creating step creates a copy image which is a digital data file in a memory of the reproduction system. In case the reproduction system comprises a scanner and a print engine, the creating step creates a copy image which is a print on a receiving material available in the reproduction system. The print is created by the print engine from a scan file resulting from a preceding scanning action of the scanner.

It is a further object of the present invention to provide a method which enables the user to produce quickly a qualitatively good copy image despite print engine problems.

According to the present invention, this further object is achieved by a method for creating a copy image from a first hardcopy original on a reproduction system, wherein the method comprises the steps of copying the first hardcopy original into a second hardcopy original, displaying a predetermined digital image at the display of the reproduction system according to image parameters which are set with initial image parameter values, reading out image parameter values entered by a user for replacing the initial image parameter values and characterizing the second hardcopy original, displaying the predetermined digital image in accordance with the read-out image parameter values, determining a first conversion of image parameters mapping the initial image parameter values of the image parameters to the read-out image parameter values, determining a second conversion of image parameters by inverting the first conversion, scanning the first hardcopy original resulting in scan-bound image parameter values, applying the second conversion to the scan values resulting in converted image parameter values, and creating the copy image by taking into account the converted image parameter values.

In a first step, a copy image is made from a first hardcopy original resulting in a second hardcopy original. By doing so, the second hardcopy original shows the user which print quality is achieved by copying by means of the particular print engine. Then similar steps may be executed as in the first embodiment. Note that the read-out image parameter values in the reading out step characterize the second hardcopy original. Note that the final copy image in the creating step is created from the first hardcopy original. This method is in particular useful when the scanner has problems in delivering a sufficient scan quality or the print engine has problems in delivering a sufficient print quality despite a good quality of the hardcopy original. The scan quality and the print quality may be determined by inspection of the colors, the brightness and the contrast of the image copy.

According to an embodiment of the method according to the present invention, the step of creating the copy image comprises printing the scanned hardcopy original. The reproduction system involved may comprise a print engine. By scanning and printing according to the method, the creating step comprises printing by the print engine which results in a qualitatively good copy image.

The present invention also relates to a reproduction system for creating a copy image from a hardcopy original, said reproduction system comprising a reproduction device configured to create a copy image from the hardcopy original, the reproduction device comprising a scanner for scanning the hardcopy original, a controller configured to control the reproduction device in order to create a copy image, a display for displaying a visual representation of a predetermined digital image according to image parameters which are set with initial image parameter values, an entering device configured to enter image parameter values characterizing the hardcopy original, said controller being configured to read out the entered image parameter values, to apply the read-out image parameter values to the visual representation of the predetermined digital image and to determine a first conversion of image parameters which maps the initial image parameter values to the entered image parameter values, wherein the controller is also configured to determine a second conversion of image parameters by inverting the first conversion and to apply the second conversion to image parameter values obtained from scanning the hardcopy original by the scanner resulting in converted image parameter values, and the reproduction device is configured to create the copy image by taking into account the converted image parameter values.

According to an embodiment of the reproduction system, the reproduction device of the reproduction system comprises a print engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same or similar elements are identified with the same reference numeral.

Figure 1A:
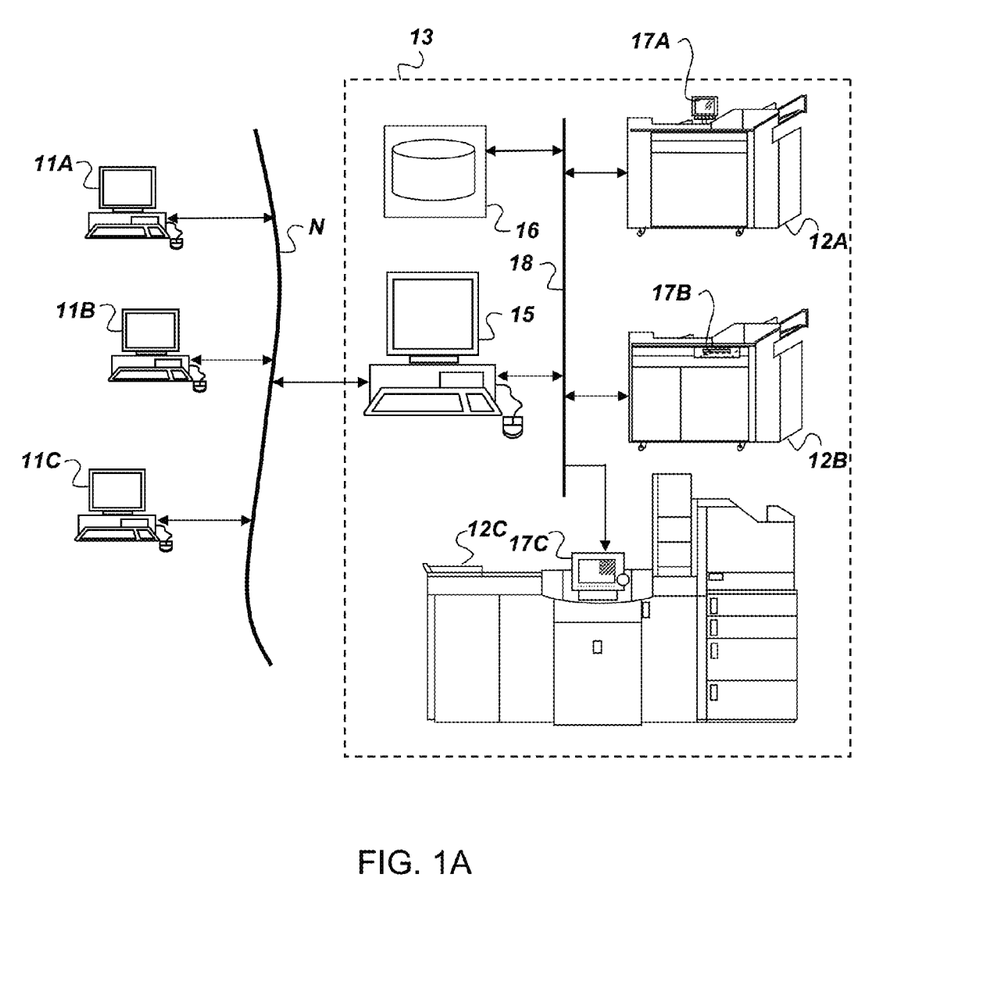
FIG. 1A is a schematic diagram of an environment comprising a plurality of reproduction systems.

FIG. 1A illustrates a general reproduction system including user workstations 11A-11C (e.g., PCs) and a centralized printing facility 13, all connected by a network N such as a Local Area Network (LAN), or even the Internet. The centralized printing facility includes a plurality of reproduction apparatuses 12A-12C and a work station 15, which may include a server operating system or a normal operating system for a PC. The centralized printing facility may also include a document database 16 or be connected to a central database facility acting as a document database. The devices in the centralized printing facility are interconnected by a local network 18, which may be part of the general network N.

In operation, users prepare documents on their workstations and submit the resulting document data files to the centralized printing facility for printing and possibly storage in the database 16. The files for printing are received by the server 15 and are, under the control of a user or operator, transferred to a printer device 12A-12C.

The server 15 runs program software and so forms a system for editing and specifying the print processing of the print job that produces the prints according to the document file submitted by the users.

Each reproduction apparatus 12A-12C has a local user interface 17A-17C. A first reproduction apparatus 12A comprises a local user interface 17A mounted on top of the reproduction apparatus 12A. A second reproduction apparatus 12B comprises a local user interface 17B integrated in a front panel of the reproduction apparatus 12B. A third reproduction apparatus 12C comprises a local user interface 17C having a touch screen mounted on top of the reproduction apparatus 12C.

When a print job arrives at the reproduction apparatus 12A-12C and the job is ready to be printed, settings of the print job are displayed on the local user interface 17A-17C. The elucidation hereinafter assumes the settings of the print job to be displayed at the local user interface of the reproduction apparatus. However, embodiments showing the settings of a print job on a work station arranged in the network N, e.g. on a window of a suitable printer driver, are not excluded from the scope of the present invention.

The reproduction apparatus according to the present invention may be an electro-photographical printer, an inkjet printer, or any other kind of reproduction apparatus. An embodiment of the reproduction apparatus uses sheets of receiving material. Another embodiment of the reproduction apparatus uses rolls of receiving material. Receiving material may be paper, textile, metal plates, printed circuit plates, solar cell plates, overhead sheet material, plastic or any other kind of suitable receiving material or substrate. The reproduction apparatus may comprise finishing options. However, finishing options of external finishing equipment may be coupled to the production system to finish a printed job and to deliver the printed job according to the wishes of a sender or a user of the print job.

Figure 1B:
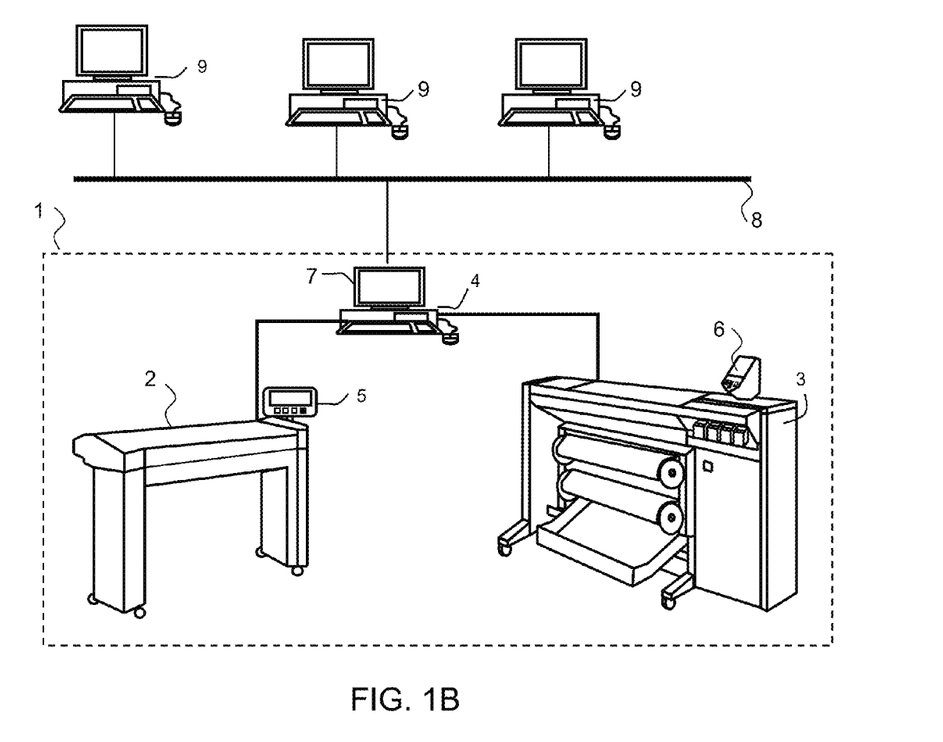
FIG. 1B is a schematic diagram of an environment comprising another reproduction system.

FIG. 1B is a schematic diagram of an environment which comprises a reproduction system 1. The reproduction system 1 as presented here comprises a scanning device 2, a printing device 3 and a control unit 4. The control unit 4 is connected to a network 8 so that a number of client computers 9, also connected to the network 8, may make use of the reproduction system 1. The number of client computers 9 may be provided with printer drivers for the scanning device 2 and the printing device 3. The printer drivers may be used to put settings of a print job or scan job and to dispatch a print job or scan job to the control unit 4.

The scanning device 2 is provided for scanning an image carrying object. The scanning device 2 may be provided with a color image sensor (i.e. a photoelectric conversion device) which converts the reflected light into electric signals corresponding to the primary colors red (R), green (G) and blue (B). The color image sensor may be for example a CCD type sensor or a CMOS type sensor. A local user interface panel 5 is provided for starting scan and copy operations.

The printing unit 3 is provided for printing images on image receiving members. The printing unit may use any kind of printing technique. It may be an inkjet printer, a pen plotter, or a press system based on an electro-(photo)graphical technology, for instance. The inkjet printer may be, for example, a thermal inkjet printer, a piezoelectric inkjet printer, a continuous inkjet printer or a metal jet printer. A marking material to be disposed may be a fluid like an ink or a metal, or a toner product. According to FIG. 1B, printing is achieved using a wide format inkjet printer provided with four different basic inks, such as cyan, magenta, yellow and black. The housing contains a print head which is mounted on a carriage for printing swaths of images. The images are printed on an ink receiving medium such as a sheet of paper supplied by a paper roll. A local user interface panel 6 may be provided with an input device such as buttons.

The scanning device 2 and the printing device 3 are both connected to the control unit 4. The control unit 4 executes various tasks such as receiving input data from the scanning device 2, handling and scheduling data files, which are submitted via the network 8, controlling the scanning device 2 and the printing device 3, converting image data into printable data, etc. The control unit 4 is provided with a user interface panel 7 for offering the operator a menu of commands for executing tasks and making settings.

Figure 1C:
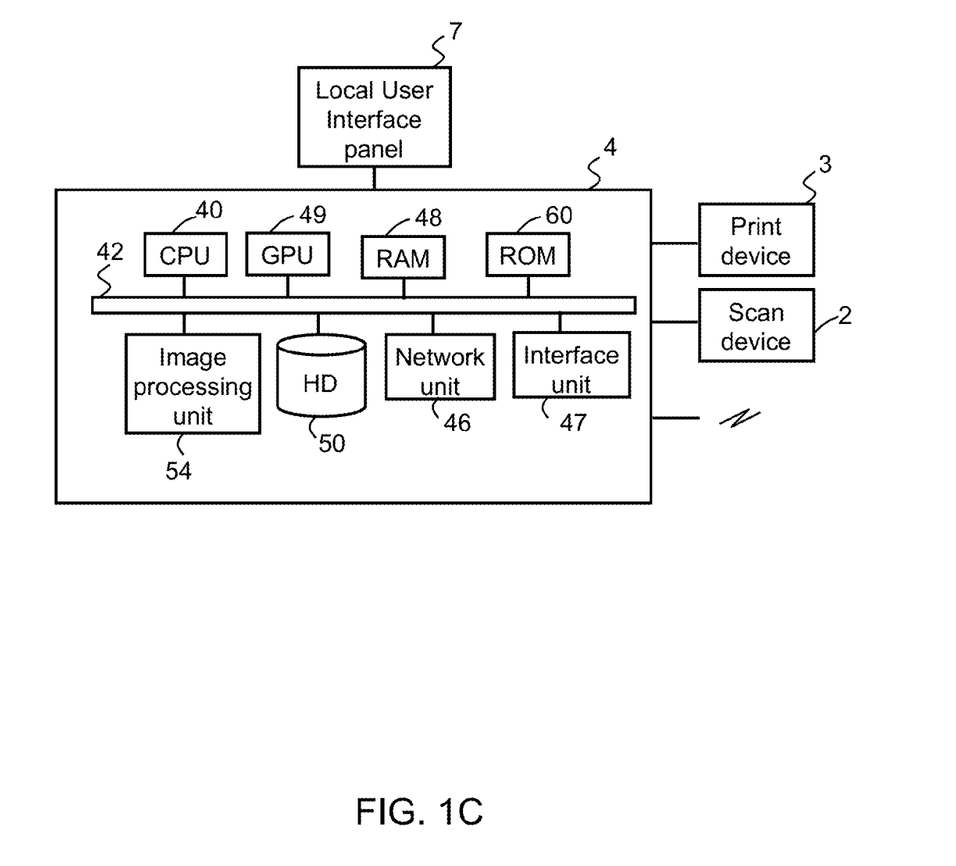
FIG. 1C is a schematic diagram of a control unit of a reproduction system according to FIG. 1A or FIG. 1B.

An embodiment of the control unit 4 is in more detail presented in FIG. 1C. As shown in FIG. 1C, the control unit 4 comprises a Central Processing Unit (CPU) 40, a Graphical Processor Unit (GPU) 49, a Random Access Memory (RAM) 48, a Read Only Memory (ROM) 60, a network unit 46, an interface unit 47, a hard disk (HD) 50 and an image processing unit 54 such as a Raster Image Processor (RIP). The aforementioned units 40, 49, 48, 60, 46, 47, 50, 54 are interconnected through a bus system 42. However, the control unit 4 may also be a distributed control unit.

The CPU 40 controls the respective devices 2, 3 of the control unit 4 in accordance with control programs stored in the ROM 60 or on the HD 50 and the local user interface panel 7. The CPU 40 also controls the image processing unit 54 and the GPU 49.

The ROM 60 stores programs and data such as a boot program, a set-up program, various set-up data or the like, which are to be read out and executed by the CPU 40.

The HD 50 is an example of a non-volatile storage unit for storing and saving programs and data which make the CPU 40 execute a print process to be characterized later. The HD 50 also comprises an area for saving the data of externally submitted print jobs. The programs and data on the HD 50 are read out from the RAM 48 by the CPU 40 as needed. The RAM 48 has an area for temporarily storing the programs and data read out from the ROM 60 and HD 50 by the CPU 40, and a work area which is used by the CPU 40 to execute various processes. The interface card 47 connects the control unit 4 to scanning device 2 and printing device 3.

The network card 46 connects the control unit 4 to the network 8 and is designed to provide communication with the workstations 9, and with other devices reachable via the network.

The image processing unit 54 may be implemented as a software component running on an operation system of the control unit 4 or as a firmware program, for example embodied in a field-programmable gate array (FPGA) or an application-specific integrated circuit (ASIC). The image processing unit 54 has functions for reading, interpreting and rasterizing the print job data. Said print job data contains image data to be printed (i.e. fonts and graphics that characterize the content of the document to be printed, characterized in a Page Description Language or the like), image processing attributes and print settings.

Basic modes of operation for the reproduction system are scanning, copying and printing.

With the electric signals corresponding to the primary colors red (R), green (G) and blue (B) obtained during scanning, a digital image is assembled in the form of a raster image file. A raster image file is generally defined to be an array of regularly sampled values, known as pixels. Each pixel (picture element) has at least one value associated with it, generally specifying a color or a shade of grey which the pixel should be displayed in. For example, the representation of an image may have each pixel specified by three 8 bit (24 bits total) values (ranging from 0-255) defining the amount of R, G, and B respectively in each pixel. In the right proportions, R, G, and B can be combined to form black, white, shades of grey, and an array of colors.

The digital image obtained by the scanning device 2 may be stored on a memory of the control unit 4 and be handled according to a copy path, wherein the image is printed by the print device 3. Alternatively, the digital image may be transferred from the control unit 4 to a client computer 9 (scan-to-file path). A user of the client computer 9 may decide to print a digital image, which reflects the printing mode of operation of the system.

Figure 2A:
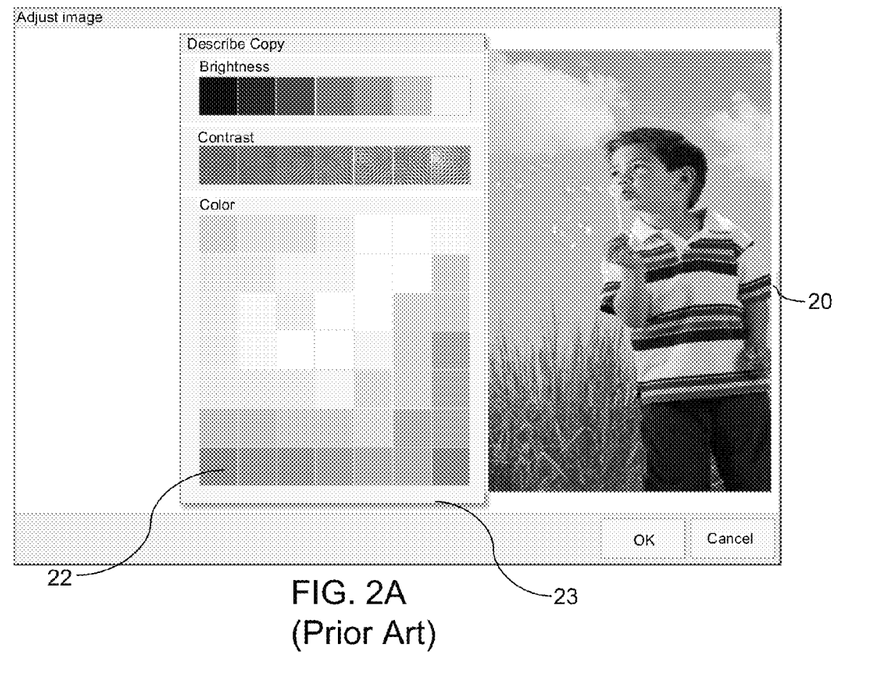
FIG. 2A is a schematic illustration of a screen to be displayed at the display means according to the prior art for adjusting a predetermined digital image in order to characterize the copy image to be made.

A schematic screen typically displayed at display means according to the prior art is shown in FIG. 2A. The display means may be located at the user interface panel 7 or at a remote client computer provided with software such as drivers for setting job processing parameters including image parameters. The schematic screen according to the prior art shows a predetermined digital image 20 in order to characterize the copy image to be made. The schematic screen may be reached via a preceding screen for setting all job processing parameters for a copy image job. The predetermined digital image 20 may be completely different from the hardcopy original to be reproduced.

To be able to characterize the copy image, an entering device configured to enter image parameters of the copy image in the form of a panel 23 is available. The panel 23 contains a row of squares, each of which represents a brightness indicator, a row of squares, each of which represents a contrast indicator, and a matrix of squares 22 each of which represents a different color indicator. The square 22 in the left lower corner of the matrix represents, for example, a blue color. All color indicators together form a complete discrete color spectrum.

Initially, the indicators are set to values in the middle of the rows and the matrix being default values. The user may select a brightness indicator, a contrast indicator and a color indicator by activating a square in each row respectively in the matrix. Since the panel 23 is to be used to characterize the copy image, the user has to figure out how to select a brightness indicator, a contrast indicator and a color indicator from the panel 23 with a desired brightness, contrast and color of the copy image. The predetermined digital image 20 will be adapted according to the selected indicators in order to show the user the result of the change of the indicators.

However, when the hardcopy original is of a poor color quality, it becomes difficult to make an adequate selection from the panel 23.

By the controller of the reproduction system, the corresponding image parameters set for the reproduction system may be adapted according to the changes made by means of the panel 23.

Figure 2B:
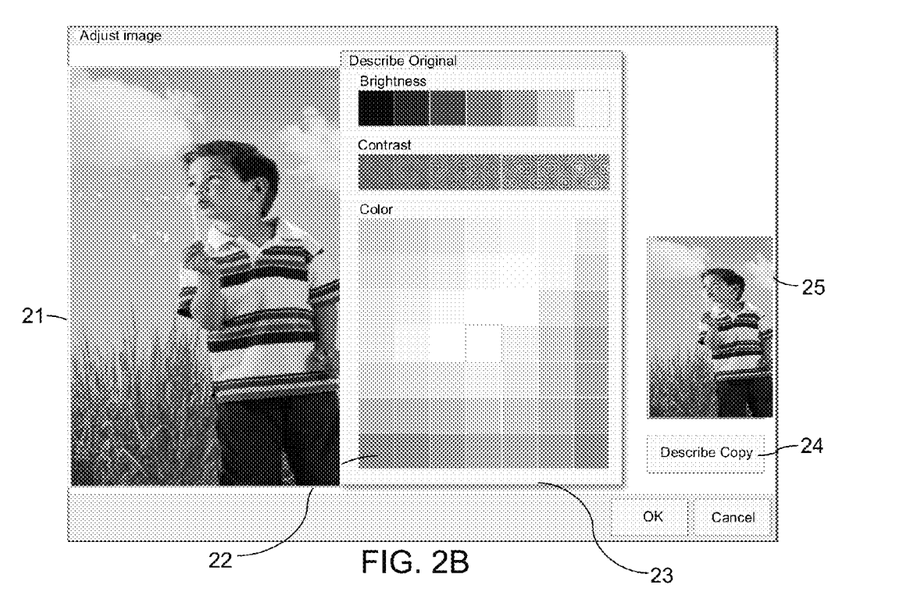
FIG. 2B is a schematic illustration of a screen according to the present invention for adjusting a predetermined digital image in order to characterize the hardcopy original.

FIG. 2B shows a schematic screen showing a first predetermined digital image 21 in order to characterize the hardcopy original (not shown). The first predetermined digital image 21 may be completely different from the hardcopy original to be reproduced. The predetermined image may comprise sub-images of human skin, grass, air and clouds. Such sub-images are known to be suitable for easily recognizing color deviations by the human eye. In an alternative embodiment, a predetermined image may be selected by the user from a collection of different images stored in a memory of the control unit of the reproduction system. To be able to characterize the hardcopy original, the reproduction system comprises an entering device configured to enter image parameters of the hardcopy original. The entering device may be configured in the form of a panel 23 when the display is a touch screen or is connected to a mouse. The panel 23 contains a row of squares, each of which represents a brightness indicator, a row of squares, each of which represents a contrast indicator, and a matrix of squares 22 each of which represents a different color indicator. The square 22 in the left lower corner of the matrix represents a blue color. The matrix of squares 22 is suitable in combination with a touch screen, since the squares 22 of the matrix may be designed so large as to be uniquely pointed at by a human finger. All color indicators in the squares 22 together form a complete discrete color spectrum. Initially, the indicators are set to values in the middle of the rows and the matrix. The user may select a brightness indicator, a contrast indicator by activating a square in each row and a color indicator by activating a square in the matrix.

Since according to the present invention, the panel 23 is to be used to characterize the hardcopy original, the user has to look at his hardcopy original and relatively easily imitates this hardcopy original at his disposition by selecting the resembling brightness indicator, contrast indicator and color indicator from the panel 23. The predetermined digital image 21 will be adapted according to the selected indicators in order to show the user the result of the change of the indicators. For example, if the hardcopy original is too blue, the user may select the square 22 in the left lower corner of the matrix and gets the first predetermined digital image 21 being more blue-colored and resembling the hardcopy original which is at his disposition.

Instead of a matrix of discrete color indicators, a square or circle of continuous colors forming the complete color spectrum may be used which may be activated by clicking by means of a finger, a mouse or any other activating tool.

By the controller of the reproduction system, the corresponding image parameters set for the reproduction system may be adapted according to the changes made by means of the panel 23. Since we have imitated the hardcopy original instead of the copy image, the selection of the appropriate brightness indicator, the appropriate contrast indicator and appropriate color indicator by means of the panel 23 results in changes of the image parameter values. The changes of the image parameter values are inverted. This inverse mapping is applied to image parameter values resulting from a scan of the hardcopy original and results in converted image parameter values which are a good starting point for the reproduction of the hardcopy original.

Figure 2C:
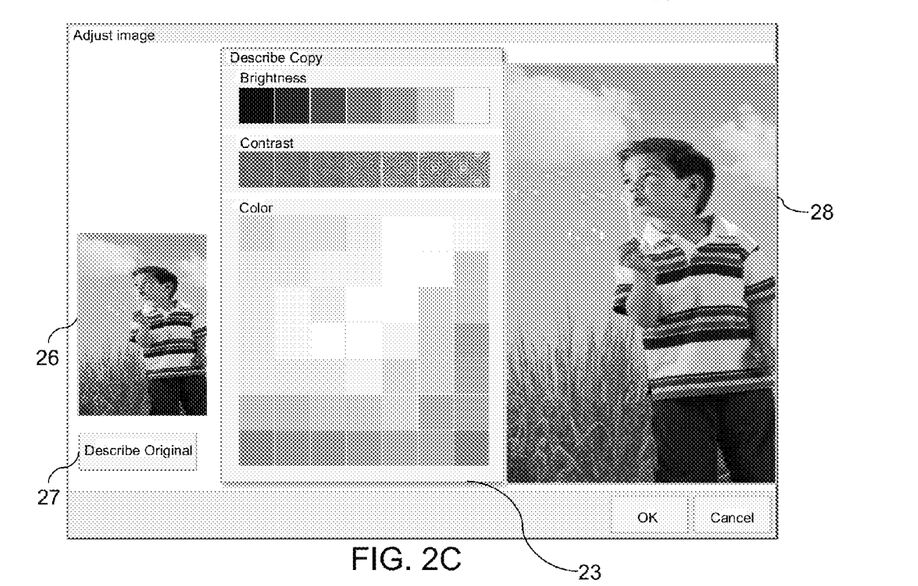
FIG. 2C is a schematic illustration of a screen according to the present invention for adjusting a first predetermined digital image in order to characterize the hardcopy original as well as for adjusting a second predetermined digital image in order to characterize the copy image.

FIG. 2C shows the schematic screen of FIG. 2B again, but now the user is also able to adjust a predetermined digital image 28 in order to characterize the copy image. This schematic screen will be obtained by activating a button 24 below the copy image 25 in FIG. 2B. This schematic screen partially resembles the prior art screen in FIG. 2A and enables the user to characterize the copy image by changing the brightness, contrast and color in the panel 23. FIG. 2C also shows a predetermined digital image 26 characterizing the hardcopy original.

According to FIG. 2C, the panel 23 is activated for changing the predetermined digital image 28 characterizing the copy image. However, the panel 23 may be activated for changing the predetermined digital image 26 characterizing the hardcopy original by activating a button 27 below the predetermined digital image 26. In this way a user may toggle between characterizing the hardcopy original and characterizing the copy image.

To show to which image 21, 25, 26, 28 of FIG. 2B-2C the panel 23 is engaged, the engaged image 21, 28 is displayed at a larger size than the non-engaged image 25, 26. For convenience reasons, the actions of characterizing the hardcopy original and characterizing the copy image are combined in one screen. However, embodiments in which each one of these actions is displayed on a separate screen are also part of the present invention. An embodiment in which only the action characterizing the hardcopy original is displayed is also part of the present invention.

Figure 3:
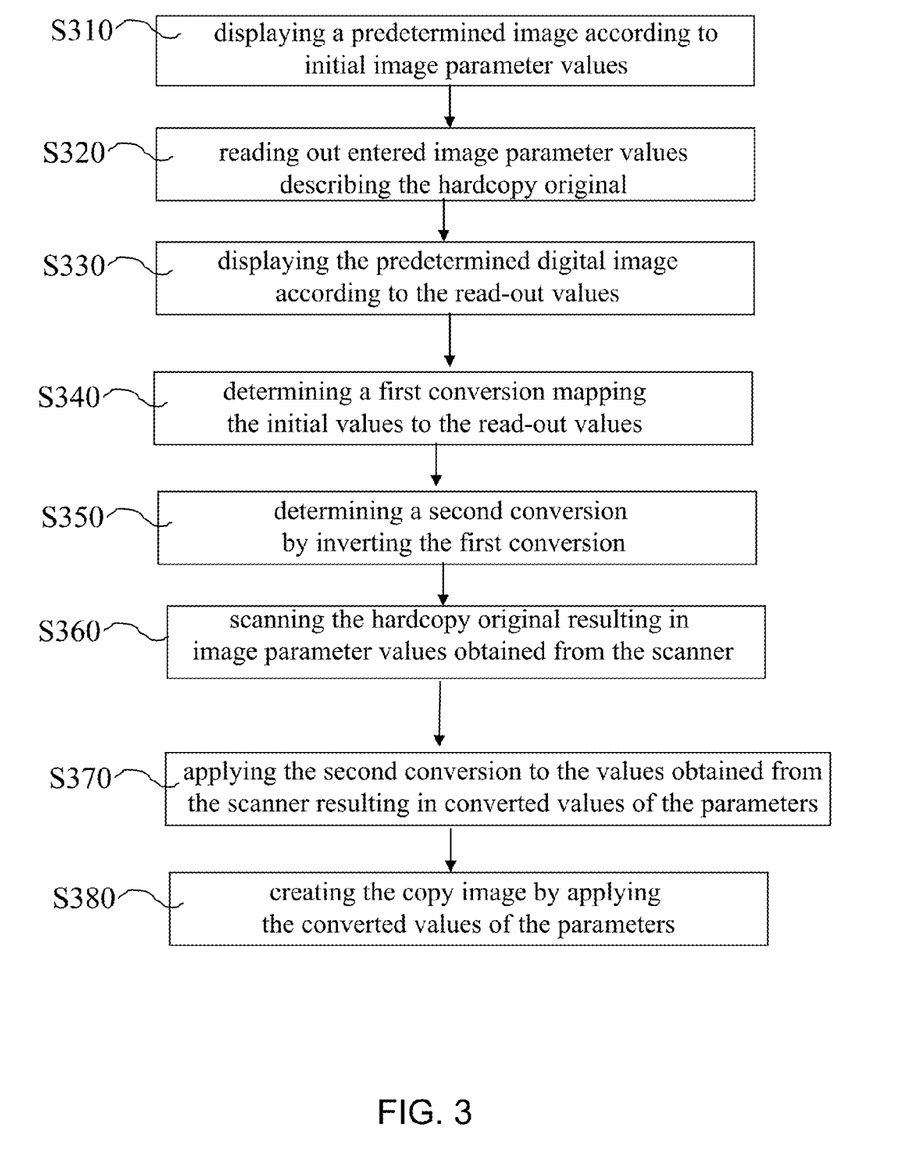
FIG. 3 is a flow diagram of an embodiment of a first method according to the present invention.

FIG. 3 is a flow diagram of an embodiment of a first method according to the present invention.

In a first step S310 of the method, a predetermined image is displayed according to the initial image parameter values.

In a second step S320, image parameter values are read out which have been entered by a user for replacing the initial image parameter values and for characterizing the hardcopy original. The user may change the initial image parameter values, for example by activating the appropriate indicators in a panel, like the panel 23. The user's goal is to let the predetermined image resemble the hardcopy original which is at his disposition.

In a third step S330, the predetermined digital image is displayed in accordance with the read-out image parameter values. When the user changes an initial image parameter value, the predetermined image will be changed and displayed accordingly.

In a fourth step S340, a first conversion of image parameters is determined which maps the initial image parameter values to the read-out image parameter values.

Hereinafter follows an example of a first conversion. The brightness indicator may be selected from discrete values −3, −2, −1, 0, +1, +2, +3. The contrast indicator may be selected from discrete values −3, −2, −1, 0, +1, +2, +3. The brightness indicator is changed from 0 to +1. The contrast indicator is changed from 0 to −1. The color indicator is changed from RGB-triple (255, 255, 255) to RGB-triple (112, 147, 246) by selecting the blue square 22 of the panel 23 in FIG. 2B.

The brightness indicator is notated as A and the mapped brightness indicator is notated as A'. The contrast indicator is notated as C and the mapped contrast indicator is notated as C'. The color indicator is notated as (R,G,B) and the mapped color indicator is notated as (R',G',B'). The first conversion is notated as F with the following arguments:

$$F(A, C, (R, G, B)) \rightarrow (A', C', (R', G', B')) \quad (1)$$

wherein A'=A+1, C'=C−1 and (R', G', B')=(R−143, G−108, B−9).

In a fifth step S350 a second conversion of image parameters is determined by inverting the first conversion. The second conversion maps the changed values to the initial image parameter values. Moreover, the second conversion is the inverted first conversion F. The second conversion is notated as G with the following arguments:

$$G(A, C, (R, G, B)) \rightarrow (A', C', (R', G', B')) \quad (2)$$

wherein A'=A−1, C'=C+1 and (R', G', B')=(R+143, G+108, B+9).

In a sixth step S360 the hardcopy original is scanned resulting in image parameter values delivered by the scanner. The image parameters characterize brightness, contrast and color. The values obtained from the scanner may be input pixel values each of which may represent a color of a pixel, a brightness value and a contrast value. The values obtained from the scanner represent the hardcopy original.

In a seventh step S370 the second conversion G is applied to the values obtained from the scanner resulting in converted image parameter values. For example, if an input pixel value is (64, 128, 32), then G maps this input pixel value to a converted value (64+143, 128+108, 32+9)=(207, 236, 41).

In an eighth step S380 the copy image is created by the scanner, respectively by the scanner in combination with the print engine, in which creation process the converted image parameter values are used.

Figure 4:
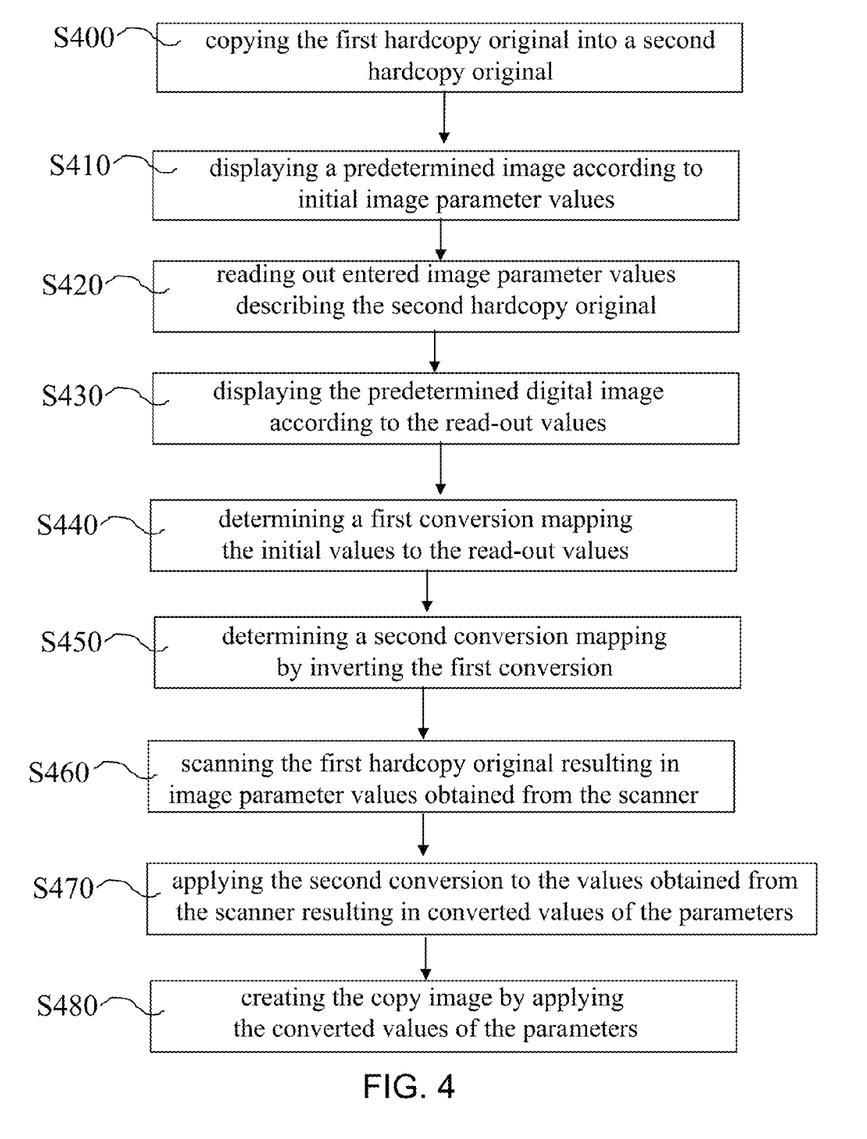
FIG. 4 is a flow diagram of an embodiment of a second method according to the present invention.

FIG. 4 is a flow diagram of an embodiment of a second method according to the present invention. In this case, the quality of a first hardcopy original is perfect, but the values obtained from the scanner may be incorrect, for example due to a wrong calibration of the scanner, or the print engine has some problems leading to a poor print quality of a print from the first hardcopy original. When copying the first hardcopy original and using the method according to the previous embodiment, a resulting image copy will still not be acceptable for the user.

Therefore, an initial step S400 is added to the previous method. In the initial step S400, the first hardcopy original is copied into a second hardcopy original. The steps S410-S480 correspond to the steps S310-S380 of FIG. 3. In fact, the steps are equal, except for the steps S320 and S420. According to step S320, the initial image parameter values are changed to let the predetermined image resemble the first hardcopy original, while according to step S420 the initial image parameter values are changed to let the predetermined image resemble the second hardcopy original. Since the second hardcopy original is printed by the print engine having print quality problems, the second hardcopy original also represents the problems of the print engine. By changing the image parameter values to resemble the second hardcopy original, the first conversion and the second conversion take these print engine problems into account. By doing so, a copy image of good print quality will be printed despite scanner problems and print engine problems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for creating a copy image from a hardcopy original on a reproduction system comprising a display, wherein the method comprises the steps of:
   a) displaying a predetermined digital image at the display of the reproduction system according to image parameters, said image parameters being set with initial image parameter values;
   b) reading out image parameter values entered by a user for replacing the initial image parameter values and characterizing the hardcopy original;
   c) displaying the predetermined digital image in accordance with the read-out image parameter values;
   d) determining a first conversion of image parameters mapping the initial image parameter values to the read-out image parameter values;
   e) determining a second conversion of image parameters by inverting the first conversion;
   f) scanning the hardcopy original resulting in scan-bound image parameter values;

g) applying the second conversion to the scan-bound image parameter values resulting in converted image parameter values; and h) creating the copy image by taking into account the converted image parameter values.

2. The method according to claim 1, wherein the hardcopy original is a first hardcopy original, said first hardcopy original being copied from a second hardcopy original and the read out image parameter values according to step c) characterize the second hardcopy original.

3. The method according to claim 1, wherein the step of creating the copy image further comprises the step of printing the scanned hardcopy original.

4. A reproduction system for creating a copy image from a hardcopy original, comprising:
   a reproduction device;
   a scanner for scanning the hardcopy original;
   a display for displaying a visual representation of a predetermined digital image according to image parameters, the image parameters being set with initial image parameter values;
   an entering device configured to enter image parameter values characterizing the hardcopy original; and
   a control configured to read out the entered image parameter values, to apply the read-out image parameter values to the visual representation of the predetermined digital image and to determine a first conversion of image parameters which maps the initial image parameter values to the entered image parameter values,
   wherein the control is also configured to determine a second conversion of image parameters by inverting the first conversion and to apply the second conversion to image parameter values obtained from scanning the hardcopy original by the scanner resulting in converted image parameter values, and
   wherein the reproduction device is configured to create the copy image by taking into account the converted image parameter values.

5. The reproduction system according to claim 4, wherein the reproduction device comprises a print engine.

* * * * *